J. N. WILKINS.
Sewing Machine.
No. 38,076.
Patented March 31, 1863.
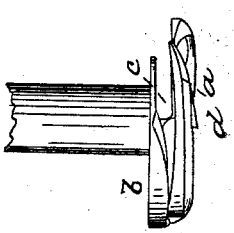
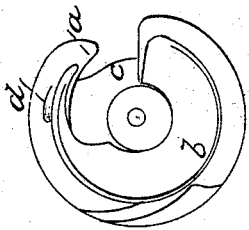

UNITED STATES PATENT OFFICE.

JOHN N. WILKINS, OF CHICAGO, ILLINOIS.

IMPROVEMENT IN SEWING-MACHINES.

Specification forming part of Letters Patent No. 38,076, dated March 31, 1863.

*To all whom it may concern:*

Be it known that I, JOHN N. WILKINS, of Chicago, in the State of Illinois, have invented a new and useful Improvement in Sewing-Machines; and I do hereby declare that the following is a full, clear, and exact description thereof, reference being had to the accompanying drawings, making part of this specification, in which—

Figure 1 is a front elevation of the rotating hook of a sewing-machine with my improvement, and Fig. 2, an edge view thereof.

The same letters indicate like parts in both figures.

My present invention relates to an improvement on the loop-controller described in and secured by Letters Patent of the United States, granted to me and bearing date the 30th day of September, 1862, which said patented invention was a substitute for the well-known loop-check previously used in that class of sewing-machines having a rotating hook for catching the loop of the needle-thread and passing it over a flat spool containing the second thread to concatenate the two threads in forming the seam. In such machines, after the loop has been enlarged and carried around the spool and cast off from the rotating hook it is indispensable to successful sewing that this loop be so held and controlled as to prevent the point of the rotating hook at its next revolution from re-entering the same loop before it enters the next succeeding loop of the needle-thread, for if it should re-enter the cast-off loop before it enters the next one the hook will then be in two loops at the same time, and the thread will be thereby broken.

The loop-controller described in and secured to me by the before-recited Letters Patent is efficient to prevent the difficulty above suggested so long as the machine is operated at the usual speed; but when operated at very high velocities that part of the loop which is cast or turned over the front face of the spool is liable to spring forward of the point of the hook and get between the hook and the needle; and the object of my present invention is to prevent the difficulty above pointed out.

In view of the object to be accomplished my said invention consists in combining with and forming on the front face of the disk of the rotating hook and a short distance back of the point of the hook a projection or shoulder to hold back that part of the loop which passes in front of the spool to hold back and thus prevent it from springing forward of the point of the hook.

In the accompanying drawings, $a$ represents the rotating hook of what is known in the trade as a "Wheeler & Wilson sewing-machine." This hook, as is well known, is formed by cutting out a part of a metal disk, $b$, which is made concave in the front face to receive the spool which carries the second thread. The rear face of this disk is cut out, as at $c$, to form an open space for the needle to work in. So far the rotating hook and its disk are as heretofore made.

On the front face and a short distance back of the point of the hook there is a projection, $d$, presenting a shoulder at the back end to hold back the loop, and a smooth surface on the outer face to the point of the hook, so that this projection will present no obstruction to the passage of the thread by the hook in the rotation to take and enlarge the loop; but while the loop is being carried around and over the spool if it should have any tendency to spring forward faster than the point of the hook travels it will strike against and be held back by the rear part of this projection until the point of the hook enters the next loop. In this way the machine can be run at the greatest velocity without danger of breaking the thread.

What I claim as my invention, and desire to secure by Letters Patent, is—

Combining with and having upon the front face of the rotating hook of a sewing-machine and a short distance back of the point of the said hook a projection or shoulder, substantially as described, to hold back the loop after it has been carried around and cast over the spool, as set forth.

JOHN N. WILKINS.

Witnesses:
 BENJN. E. GALLUP,
 EDW. S. EVARTS.